United States Patent
Mennenga et al.

(10) Patent No.: US 7,130,658 B2
(45) Date of Patent: Oct. 31, 2006

(54) SHARED CIRCUITRY FOR WLAN RECEIVER FUNCTIONAL UNITS

(75) Inventors: Menno Mennenga, Dresden (DE); Frank Poegel, Dresden (DE); Jorg Borowski, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 431 days.

(21) Appl. No.: 10/259,718

(22) Filed: Sep. 27, 2002

(65) Prior Publication Data

US 2003/0216154 A1 Nov. 20, 2003

(30) Foreign Application Priority Data

May 17, 2002 (DE) ................................ 102 22 115

(51) Int. Cl.
H04B 1/38 (2006.01)
H04M 1/00 (2006.01)

(52) U.S. Cl. .................. 455/561; 455/502; 455/562.1; 455/517; 455/101; 455/132; 455/134; 370/350; 370/265; 370/497; 370/503; 375/134; 375/149; 375/152

(58) Field of Classification Search ................ 455/561, 455/502, 562.1, 101, 132, 134; 375/134, 375/140, 149, 152, 347; 370/343, 350, 265, 370/480, 497, 503
See application file for complete search history.

(56) References Cited

U.S. PATENT DOCUMENTS

| | | | | |
|---|---|---|---|---|
| 4,481,640 A | * | 11/1984 | Chow et al. ................ | 375/143 |
| 4,601,045 A | * | 7/1986 | Lubarsky .................... | 375/260 |
| 5,737,329 A | * | 4/1998 | Horiguchi .................. | 370/342 |
| 5,793,757 A | | 8/1998 | Uddenfeldt | |
| 6,614,836 B1 | * | 9/2003 | Halford et al. ............. | 375/152 |
| 2002/0131480 A1 | * | 9/2002 | Sousa et al. ................ | 375/147 |
| 2003/0147374 A1 | * | 8/2003 | Chiu et al. .................. | 370/349 |
| 2003/0161421 A1 | * | 8/2003 | Schmidt et al. ............. | 375/346 |

(Continued)

FOREIGN PATENT DOCUMENTS

JP 08265292 A * 10/1996

OTHER PUBLICATIONS

Keller, et al "OFDM synchronisation techniques for WLAN networks", IEEE international symposium on personal indoor and mobile radio communications, Oct. 15, 1996, pp. 963-967.*

(Continued)

*Primary Examiner*—Matthew D. Anderson
*Assistant Examiner*—Sujatha Sharma
(74) *Attorney, Agent, or Firm*—Meyertons Hood Kivlin Kowert & Goetzel, P.C.; B. Noël Kivlin

(57) ABSTRACT

A WLAN (Wireless Local Area Network) receiver having a synchronization unit is provided. The synchronization unit comprises a first functional unit for performing a first signal processing function, a second functional unit for performing a second signal processing function different from the first signal processing function, and at least one signal processing circuit. In the synchronization unit the first functional unit is operating at least one of the signal processing circuits for performing the first signal processing function, and the second functional unit is arranged for operating the at least one signal processing circuit operated by the first functional unit for performing the second signal processing function. Since the above-described signal processing circuits or modules can be re-used for the antenna diversity unit and the preamble detection unit this results in a smaller number of gates and an improved density of the circuitry.

63 Claims, 6 Drawing Sheets

U.S. PATENT DOCUMENTS

| | | |
|---|---|---|
| 2003/0169706 A1* | 9/2003 | Poegel et al. ............... 370/334 |
| 2004/0086070 A1* | 5/2004 | Sachse et al. ............... 375/375 |
| 2004/0109419 A1* | 6/2004 | Sano et al. ................. 370/320 |
| 2004/0156309 A1* | 8/2004 | Chadha et al. .............. 370/208 |
| 2005/0025117 A1* | 2/2005 | Inagaki et al. .............. 370/350 |
| 2005/0068886 A1* | 3/2005 | Wang et al. ................ 370/210 |

OTHER PUBLICATIONS

German Application No.: 12022 115.4, Official Communication Dated Jun. 29, 2005, (5 pages).

* cited by examiner

SHARED CIRCUITRY FOR WLAN RECEIVER FUNCTIONAL UNITS

BACKGROUND OF THE INVENTION

1. Field of the Invention

The invention generally relates to WLAN (wireless local area network) receivers, and in particular to functional units in such WLAN receivers.

2. Description of the Related Art

Flexibility is an important feature for modern data communication systems. This flexibility is, for example, offered by a wireless local area network implemented as an extension to or as an alternative for a wired LAN. Using radio frequency or infrared technology, WLAN systems transmit and receive data over the air, minimizing the need for wired connections. Thus, WLAN systems are offering the kind of mobility which allows the WLAN users to have access to real time information anywhere. This mobility supports productivity and service opportunities not possible with wired networks. Moreover, wireless data transmission simplifies the installation of a LAN system and provides a wide range of scalability.

To transmit data using radio waves in a WLAN the data being transmitted is superimposed onto a carrier wave. This process is called modulation. Today, most WLAN systems modulate carrier waves using spread spectrum technology, a wideband radio frequency technique developed for use in reliable and secure communication systems. This technology is designed to trade off bandwidth efficiency for reliability, integrity and security. Two different spread spectrum modulation types are offered: frequency hopping spread spectrum (FHSS) and direct sequence spread spectrum (DSSS).

FHSS systems hop from frequency to frequency in a pattern known to both the transmitter and receiver. DSSS systems create a redundant bit pattern called a chip or chipping code, for each transmitted bit. The transmitter and receiver both know the chipping code and are thus able to filter out signals that do not use the same bit pattern.

DSSS systems use bandwidth more efficiently than FHSS systems. Consequently, WLAN systems based on DSSS generally have higher throughput than their FHSS counterparts.

A standard for WLAN operations at data rates up to 2 Mbps in the 2.4-GHz ISM (Industrial, Scientific and Medical) band, is the IEEE 802.11 standard. To offer a higher bandwidth, the standard IEEE 802.11b was defined for data rates up to 11 Mbps in the 2.4-GHz ISM band and furthermore the IEEE 802.11a standard for data rates up to 54 Mbps in the 5-GHz Unlicensed National Information Infrastructure (UNII) band.

The IEEE 802.11 standard for wireless LANs using direct sequence spread spectrum technique employ a training preamble to train a receiver to a transmitter. Each transmitting data message comprises an initial training preamble followed by a data field. The preamble includes a synchronization field to ensure that the receiver can perform the necessary operations for synchronization. For the preamble length, two options have been defined, namely a long or a short preamble. All 802.11b compliant systems have to support a long preamble. The short preamble option is provided in the standard to increase the network throughput when transmitting special data such as voice and video. The synchronization field of a preamble consists of 128 bits for a long preamble and 56 bit for a short preamble.

Synchronization is one crucial aspect of the receiver. There are several methods to deal with the synchronization task. One approach was to use digital signal processing (DSP) providing high speed mathematical functions that can slice up in many small parts and analyze the spread spectrum signal to synchronize and decorrelate it. Another approach was to use applications specific integrated circuits (ASIC) as ASIC chips drive down the costs by using VLSI technology and creating generic building blocks that can be used in any type of application the designer wishes.

When operating a WLAN receiver, code synchronization is necessary because the code is a key to despreading the desired information. A good synchronization is achieved when the coded signal arrived in the receiver is accurately timed in both its code pattern position and sample selection.

For synchronization, the receiver detects the synchronization symbols and aligns the receiver's internal clock to the symbols in the synchronization field in order to establish a fixed reference time frame with which to interpret the fields in the transmission frame structure following the preamble. The preamble, including the synchronization field, is transmitted at the start of every message (data packet).

Another aspect of WLAN communication is, that in a mobile radio channel the signal level received at the antenna depends strongly on the location of the reception point. There can be large variations in the signal level over rather short distances. These signal variations can lead to situations where a receiver with a single antenna cannot receive a sufficiently strong signal to deliver acceptable reference. On the other hand, if more than one antenna is used, the chance that at least one antenna receives a sufficiently strong signal is increased. The approach of using several antennae that are spaced apart is called space or antenna diversity.

When several antennae are employed to pick up the radio signal there needs to be a mechanism to combine the signals that arrive at the antenna elements. A simple and cost effective approach is to select the antenna with the highest received signal power. Other approaches such as combining techniques may yield a higher performance but they need more than one RF and base band part. This is a requirement that considerably drives up system costs.

The acquisition problem is one of searching throughout a region of time and frequency (chip, carrier) in order to synchronize the spread spectrum signal with the locally generated sequence. Since the despreading process typically takes place before a carrier synchronization, and therefore the carrier is unknown at this point, most acquisition schemes utilize non-coherent detection.

FIG. 1 shows a block diagram of a prior art WLAN receiver 100. Via one or more antennae 110 the receiver receives a data stream from a WLAN transmitter and feeds the antenna output to a signal processing unit 120. In the signal processing unit the received data signals are preprocessed and handed over to the synchronization unit 130. After synchronizing the received data signals the synchronized data signals are handed over to the digital signal processing unit 140 for further digital signaling processing. The antenna selection is done by the antenna diversity controller or finite state machine. Its purpose is to measure at the beginning of said preamble which antenna delivers the strongest signal. This antenna will be the receive antenna for the frame. After selecting the antenna the preamble is detected by a preamble detection unit that scans the incoming data stream for a preamble while the receiver is in the receive mode. Its purpose is to detect a preamble and to determine whether a short or a long preamble is being received. It will also determine the boundaries between consecutive Barker symbols such that the following processing blocks can adjust their processing schedule accordingly. Finally, it will deliver an initial frequency error estimate that will be used in the frequency error correction module for an initial frequency error correction. Moreover, a synchronization unit performs a non-coherent detection to find the start of frame delimiter that divides preamble and header.

Due to this wide range of different tasks the synchronization circuits in existing WLAN receivers are very complex. As the digital signal processing functions need a plurality of functional units the circuits are highly involved. Therefore the costs of circuit development and manufacturing are high.

SUMMARY OF THE INVENTION

An improved WLAN receiver and operation method are provided that may allow a smaller number of gates resulting in a smaller die area and furthermore reduced manufacturing costs.

In one embodiment, a WLAN receiver having a synchronization unit is provided. The synchronization unit comprises a first functional unit arranged for performing a first signal processing function, a second functional unit arranged for performing a second signal processing function different from the first signal processing function, and at least one signal processing circuit. In the synchronization unit the first functional unit is arranged for operating at least one of the signal processing circuits for performing the first signal processing function, and the second functional unit is arranged for operating the at least one signal processing circuit operated by the first functional unit for performing the second signal processing function.

In another embodiment, there may be provided an integrated circuit chip comprising a synchronization circuitry for use in a WLAN receiver. The synchronization circuitry comprises a first functional unit arranged for performing a first signal processing function, a second functional unit arranged for performing a second signal processing function different from the first signal processing function and at least one signal processing circuit. In the synchronization circuitry the first functional unit is arranged for operating at least one of the signal processing circuits for performing the first signal processing function, and the second functional unit is arranged for operating the at least one signal processing circuit operated by the first functional unit for performing the second signal processing function.

In a further embodiment, there may be provided a method of operating a synchronization unit in a WLAN receiver. The method comprises performing a first signal processing function and performing a second signal processing function different from the first signal processing function. The step of performing the first processing function comprises operating at least one signal processing circuit of the synchronization unit and the step of performing the second signal processing function comprises operating said at least one signal processing circuit.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiment of the present invention will be described with reference to the figure drawings.

Figure 1:
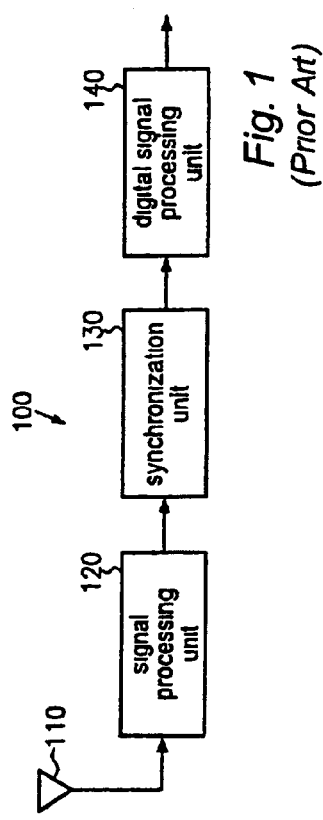
FIG. 1 is showing a block diagram illustrating a prior art WLAN receiver.
Figure 2:
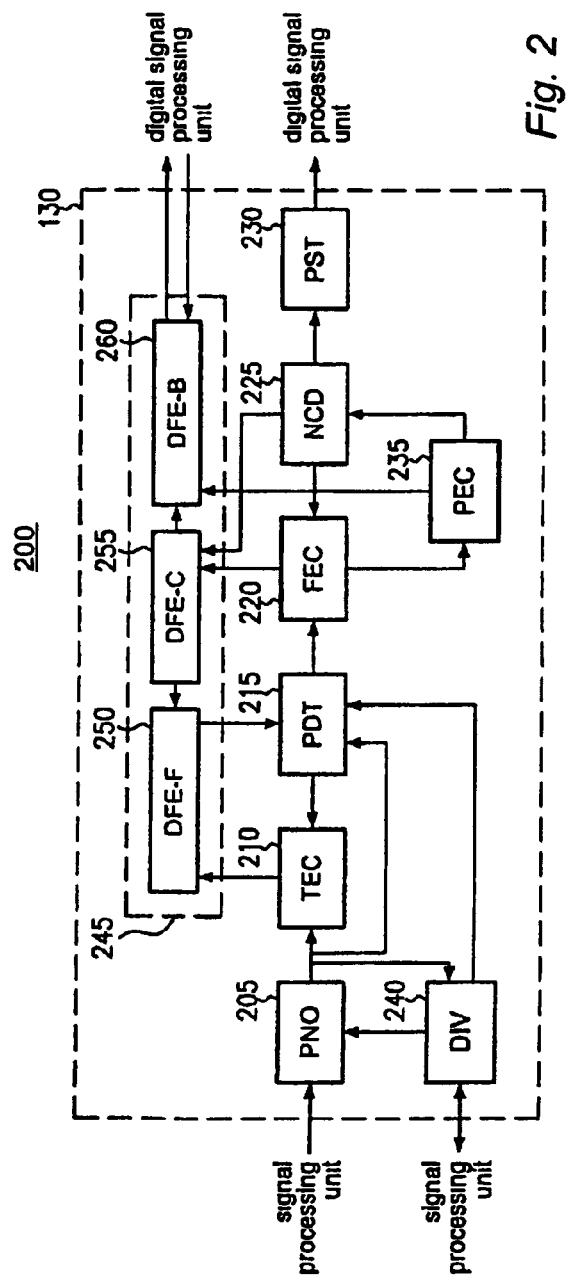
FIG. 2 is showing a block diagram illustrating the components of WLAN receiver according to an embodiment.

Referring now to the drawings and in particular to FIG. 2 which illustrates the functional units of a WLAN receiver according to an embodiment. The receiver has a radio-frequency part and a base band part 200 that is connected to the radio frequency part. The radio-frequency part is an analog circuit that receives an analog signal and provides a digitized representation thereof to the base band part 200. For this purpose, the radio-frequency part comprises an analog-to-digital converter (ADC).

Moreover, the radio-frequency part performs an automatic gain control (AGC) to control the amplification gain dependent on a received signal power or a strength. The AGC unit is located in the analog radio frequency part and interchanges control signals with the digital circuitry of the base band part 200.

The base band part 200 of the WLAN receiver of the present embodiment shown in FIG. 2 has a number of units that are interconnected to former data path. That is, the base band part 200 receives the digitized input signal from the radio frequency part and generates output data that is to be filtered, demodulated, decoded and descrambled for further processing.

When receiving the digitized input signal in the base band part 200, a power normalization (PNO) is performed in unit 205 normalized the power of the input signal. The power normalization may be performed on the control of an antenna diversity (DIV) unit 240 that controls antenna diversity and which is connected to the automatic gain controller of the radio-frequency part. For performing the diversity selection, unit 240 receives the normalized signal from unit 205.

The antenna diversity unit 240 may further provide a control signal to preamble detection (PDT) unit 215. The preamble detection unit 215 receives the normalized signal from unit 205 and detects a preamble in the signal.

As may be seen from FIG. 2, the preamble detection unit 215 provides output signals to a timing error correction (TEC) unit 210 and a frequency error correction (FEC) unit 220. These units are used to detect and correct timing errors and frequency errors, respectively.

As mentioned above, the preamble detection unit 215 receives the normalized input signal from power normalization unit 205. In addition, it receives input from the feed forward filter (DFE-F) 250 of a decision feedback equalizer 245. The feed forward filter 250 receives the output signal of the timing error correction unit 210 and filters the signal under control of the decision feedback equalization controller (DFE-C) 255. A filtered signal is fed to the preamble detection unit 215.

As can further be seen from FIG. 2, the decision feedback equalization controller 255 may operate dependent on certain input signals that are received from the frequency error correction unit 220 and/or the non-coherent detection (NCD) unit 225. The non-coherent detection unit 225 filters and demodulates a signal that is received from the phase error correction (PEC) unit 235 to obtain a demodulated binary reference sequence. This binary reference sequence is fed into the decision feedback equalization controller 255 for joint processing with the data signal coming from frequency error correction unit 220.

The phase error correction unit 235, that provides a signal to a non-coherent detection unit 225, receives an output signal from the frequency signal error correction unit 220. That is, the frequency control and the phase control is done in two separate stages, and the phase error correction is performed based on a signal that has previously been corrected with respect to a frequency error.

As apparent from the figure, the phase error correction unit 235 further provides an input signal to the feedback signal 260 of the decision feedback equalizer 245. The feedback filter 260 filters this data to provide output data, and it is controlled by the decision feedback equalization controller 255. Further, the feedback filter 260 may receive a signal which is indicative of the data rate.

Moreover, there is provided a packet start detection (PST) unit 230 that detects the start of frame delimiter (SFD) portion in the received data signal to generate a packet start control signal. For this purpose, the packet start detection unit 230 receives input from the non-coherent detection unit 225.

As apparent from the foregoing description of the present embodiment, the receiver comprises a number of units that form a data path. Each unit is for performing a given function in the synchronization (equalization and tracking) process. As each function of the individual units is required in only a given period of time, the units are activated in the present embodiment in a predetermined sequence. Once the function of the given unit is no longer required, the unit may be deactivated.

Figure 3:
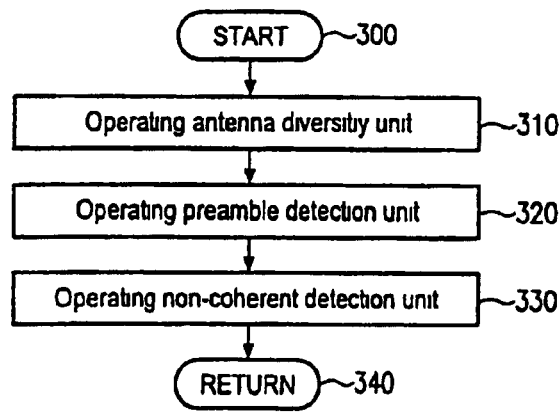
FIG. 3 is showing a flowchart illustrating the process of operating specific functional units in a synchronization unit according to an embodiment.

Referring now to FIG. 3 the shown flow chart illustrates the sequence of operating the functional units. In the embodiment described above, first the diversity selection unit 240 is operated (step 310). After this functional unit is deactivated the preamble detection unit 215 is operated in step 320 to detect a preamble in a received data stream. In step 320 the non-coherent detection unit 225 is activated and operated to demodulate data in a received data stream and to find the start of frame delimiter that divides preamble and header.

As described above a WLAN receiver may have several antennae. The function of the antenna diversity unit is to select an appropriate antenna, which is not necessarily the best, for the reception of the current frame. To do this, the antenna diversity unit has to detect a signal first. The signal detection is done by evaluating a signal which will indicate if the received data stream signal has a signal to noise ratio larger than a certain value, and the power of the received data stream signal is also larger than a certain threshold, which is achieved by checking, if the power of the received data stream signal is repeatedly, in equidistant points of time, exceeding a specific threshold.

The antenna selection process depends on which input gave rise to the signal detect, if the signal to noise ratio is larger than the certain value the finite state machine will simply lock the currently selected antenna. If, on the other hand, the strength of the received data stream signal input exceeds the detection threshold, the currently selected antenna will not be locked immediately. Rather, the antenna diversity unit first measures the signal level with the currently selected antenna and then switches to the other antenna to check the signal level there. If the signal level at the new antenna exceeds the signal level at the old antenna, the new antenna is locked; otherwise the antenna will be switched back and the previous antenna will be locked. If both measured signal levels are below the threshold, periodic switching will start again.

After the antenna is selected the preamble detection unit scans the incoming data stream for a preamble while the receiver is in the receive mode. As the purpose of the preamble detection unit is to detect a preamble and to determine whether a short or a long preamble is being received, it will also determine the boundaries between consecutive Barker symbols such that the following processing blocks can adjust the processing schedule accordingly. Finally it will deliver an initial frequency error estimate that will be used in the frequency error correction unit 220 for an initial frequency error correction.

As mentioned above in a next step the non-coherence detection is operated to filter and demodulate the received signal to find the start of frame delimiter.

It is contemplated that further operating steps may be added and inserted in the embodiment described above.

Figure 4:
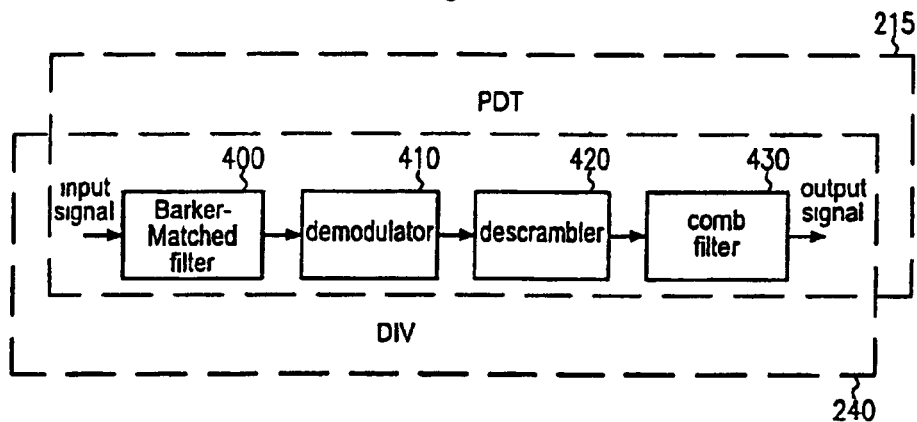
FIG. 4 is showing a block diagram illustrating a preamble detection unit and an antenna diversity unit according to an embodiment.

FIG. 4 illustrates the embodiment described herein in detail. It shows schematically the antenna diversity unit 240 and the preamble detection unit 215 in a block diagram. Both functional units are operating a Barker-Matched filter 400 to which the input signal of the antenna diversity unit and the input signal of the preamble detection unit is connected. The Barker-Matched filter 400 is used for correlating a Barker spreading code. The output of this signal processing circuit is connected to a demodulator 410 which is also operated from the antenna diversity unit and the preamble detection unit. The signal processing circuit 410 differentially demodulates the output of the Barker-Matched filter and feeds it to a descrambler module 420. As the output of the demodulator module is still scrambled the task of the descrambler module is to descramble the received data stream. The output of the descrambler is fed into the comb filter 430, which is also operated by the antenna diversity unit and the preamble detection unit. A comb filter is smoothing the output of the demodulation line over which the data has traveled so far. To achieve this the comb filter keeps track of average values for both the real and the imaginary data stream. Since the antenna diversity unit and the preamble detection unit are operated one after the other, both units can share the signal processing circuits they need to perform the corresponding signal processing function.

Since the above-described signal processing circuits or modules can be reused for the antenna diversity unit and the preamble detection unit as the algorithms of both functional units require knowledge about the current signal level, this results in a smaller number of gates and an improved density of the circuitry. The smaller die area may offer not only the possibility of further miniaturization, but also the advantage of reducing the manufacturing costs.

Figure 5:
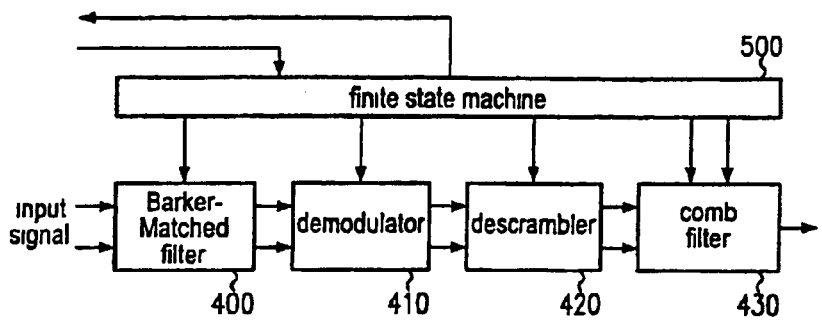
FIG. 5 is showing another block diagram illustrating the components shown in FIG. 4.

Returning now to FIG. 5, a more detailed block diagram of the above-described embodiment is shown. It illustrates that two input signals are provided to the Barker-Matched filter 400 the two input signals are the real and the imaginary data stream of the received signal which is fed through all signal processing functions operated by the antenna diversity unit and the preamble detection unit. Furthermore, a finite state machine 500 is shown which receives input signals from the antenna diversity unit and the preamble detection unit and output signal to the described functional units. Furthermore, the finite state machine outputs control signals to the functional unit and receives output signals from the comb filter. In the embodiment described above one single state machine is used for both functional units the antenna diversity unit and the preamble detection unit to control the digital signal processing circuit. It is noted that other embodiments are possible in which one finite state machine for each functional unit is provided.

The finite state machine provides a number of input and output ports for inputting and outputting the necessary control signals to perform the above mentioned tasks of the preamble detection unit and the antenna diversity unit.

Furthermore, the finite state machine provides an activation signal for each digital signal processing circuit to activate specific electronic components in these circuits. Additionally, it provides a selection signal for selecting an operation mode of the comb filter depending on the functional unit operating that comb filter.

In a modification of this embodiment the described signal processing circuits will also provide status signals for the finite state machine to indicate their operation status.

Figure 6:
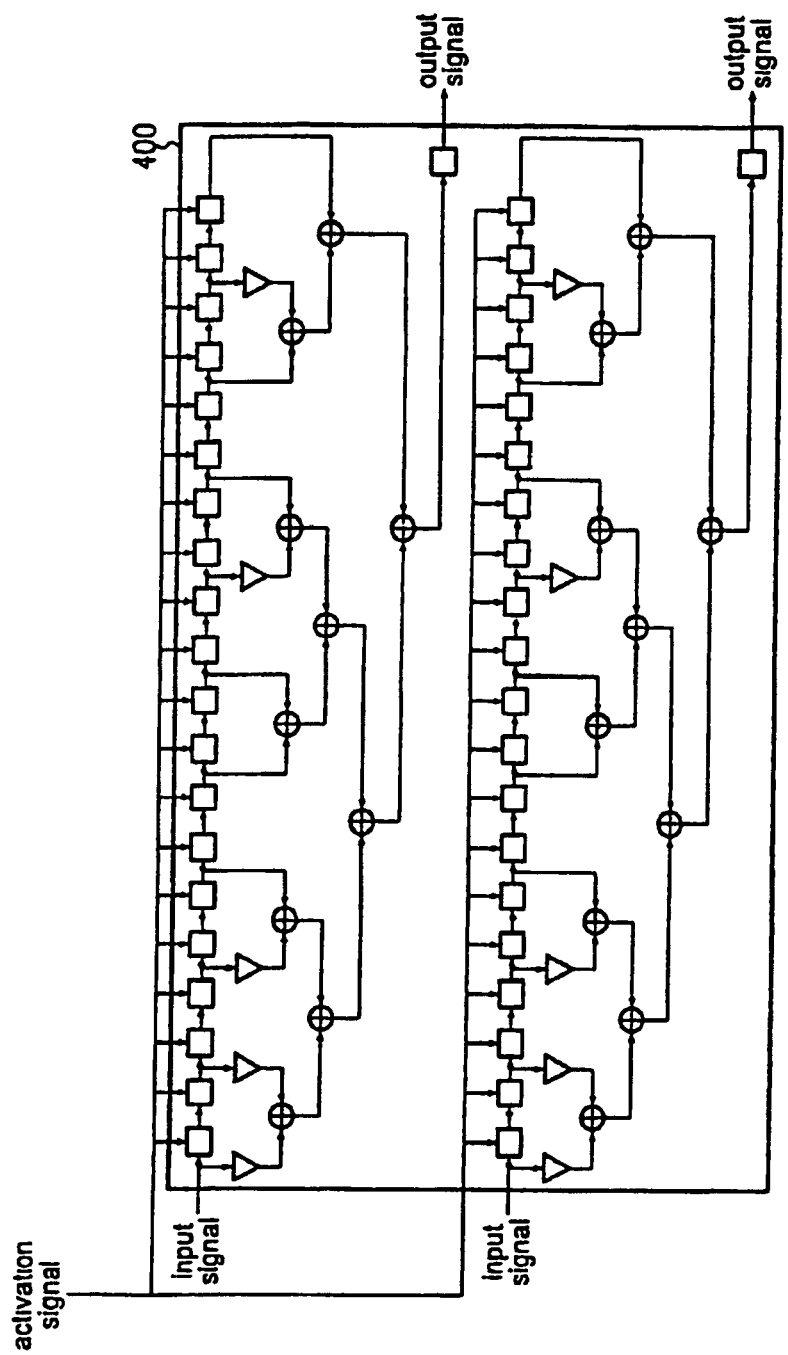
FIG. 6 is showing a block diagram illustrating a datapath in a Barker-Matched filter according to an embodiment.

Referring now to FIG. 6, an exemplary embodiment of a Barker-Matched filter 400 is shown. The complex input signals of the Barker-Matched filter (compliant with 802.11b) are correlated with the coefficients of the Barker sequence and output to the demodulator 410. Specifically, the real and imaginary input signals are connected to a series of flip flops. Each flip flop is connected to an activation signal provided by the finite state machine 500. Furthermore, these flip flops are connected to a number of inverters and adders in a tree structure and results of the adders are fed to output registers. From these registers the real and imaginary part of the filtered signal is forwarded to the demodulator 410.

Figure 7:
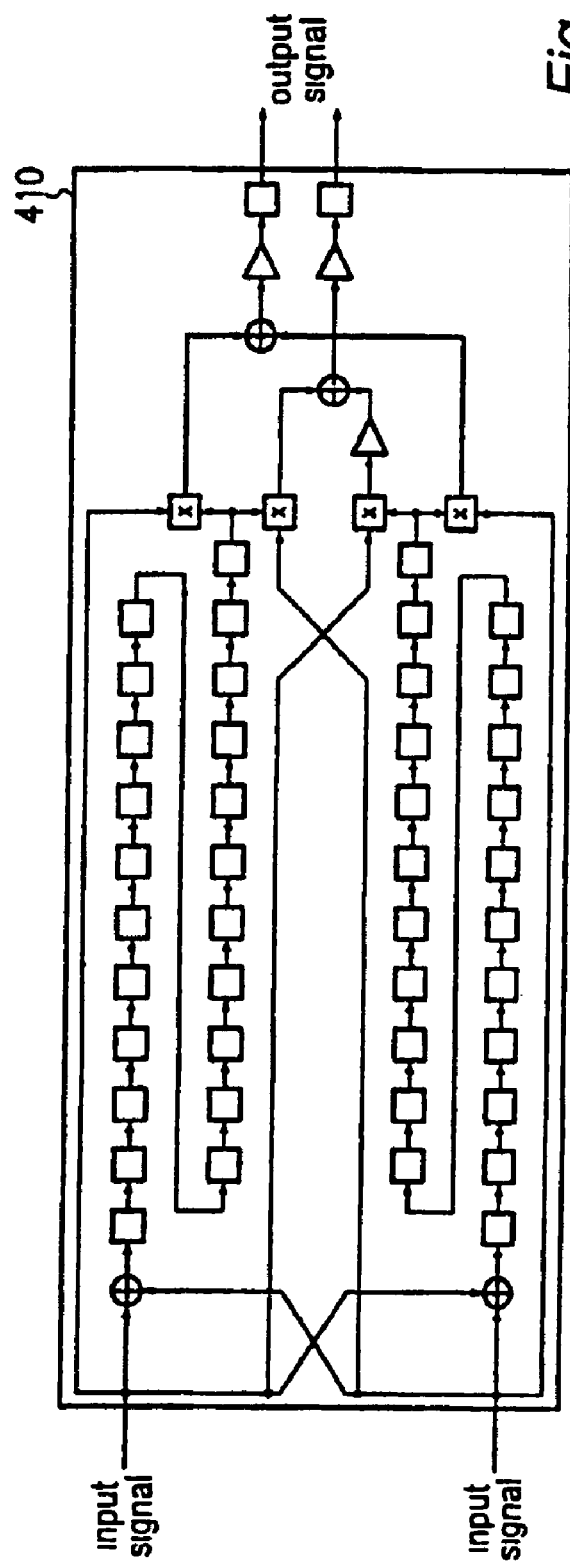
FIG. 7 is showing a block diagram illustrating a datapath in a demodulator according to an embodiment.

Referring now to FIG. 7, an exemplary block diagram of a descrambler 410 is shown. The demodulator modulates differentially the real and imaginary part of the Barker-Matched filter output and feeds it to the descrambler 420. In detail, the real part of the input signal is connected to an adder together with the imaginary part of the input signal. The result of the adder is fed to a series of flip flops, which are finally connected to multipliers. The imaginary part of the, input signal is first connected to an inverter and then to an adder together with the real part of the input signal. The result of this adder is also fed to a series of flip flops which are finally also connected to multipliers. The output of the multipliers are connected to adders and inverters and the resulting signal is forwarded to output registers from which the signals are outputted to the descrambler for 420. As shown in FIG. 6 each flip flop register is also connected to an activation signal provided by the finite state machine 500.

Figure 8:
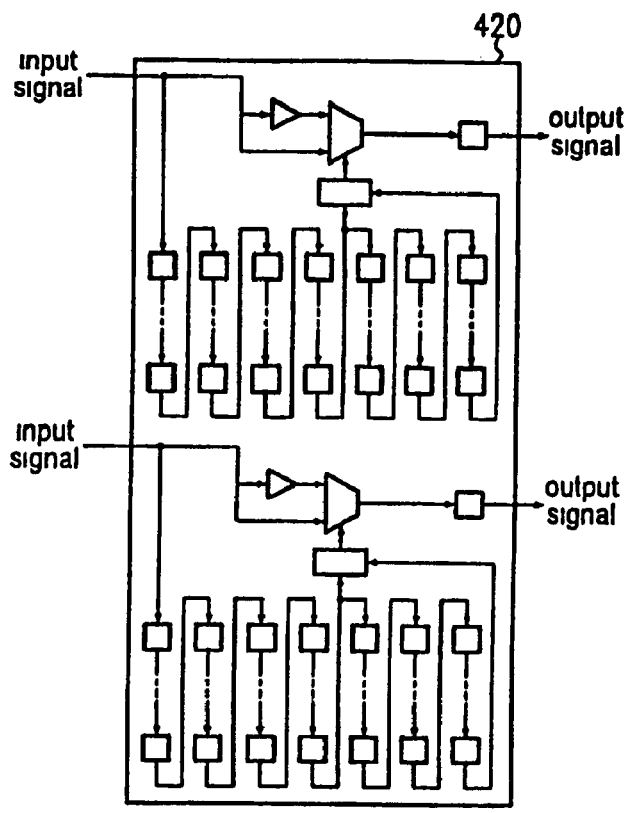
FIG. 8 is showing a block diagram illustrating a datapath in a descrambler according to an embodiment.

Turning now to FIG. 8, an exemplary data path of a descrambler is shown in a block diagram. The output signal of the demodulator 410 is connected to the input ports of the descrambler. The task of the descrambler is to descramble the data stream and output it to the comb filter. Specifically, the real and imaginary parts of the input signal are each connected to a series of flip flops, to an inverter and a combiner. The outputs of the flip flops are each connected to an XOR gate and then fed to a combiner. The results of the combiners are forwarded to output registers. From that registers the real and imaginary part of the output signal is forwarded to the comb filter. As already shown in FIG. 6, all flip flops are connected to an activation signal provided by the finite state machine 500.

Figure 9:
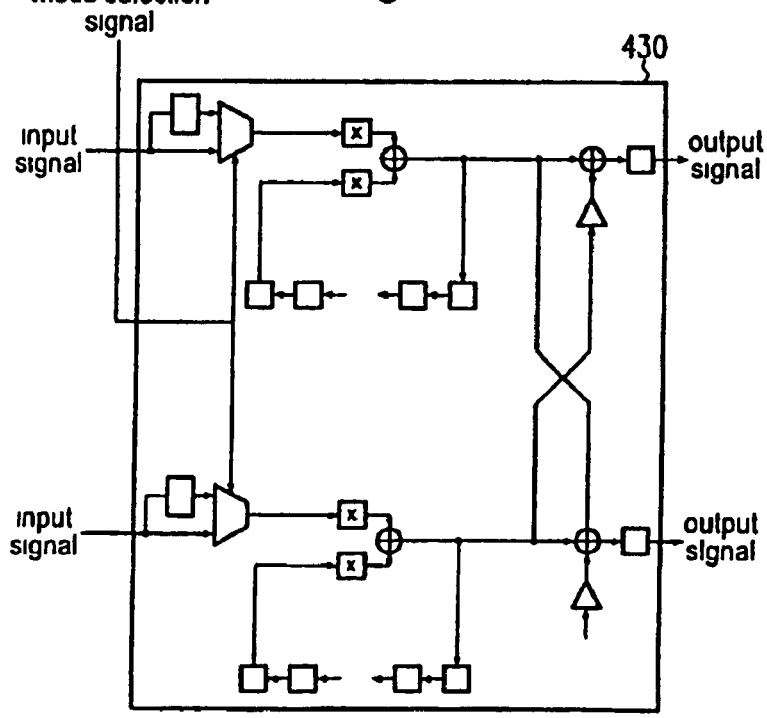
FIG. 9 is showing a block diagram illustrating a datapath in a comb filter according to an embodiment.

FIG. 9 shows an exemplary data path of a comb filter 430 used in the embodiment described above. The outputs of the descrambler 420 are connected to the input ports of the comb filter. The task of the comb filter is to smooth the output of the demodulation line over which the data stream has traveled so far. The real data signal is connected to a comparator and then fed to a multiplier and the output of the multiplier is coupled to an adder. The result of the adder is fed to a second adder and through the series of registers and a second multiplier back to the first adder. The second adder combines the modified real data signal with a modified imaginary data signal and forwards it to an output register. Similarly, the imaginary data signal is connected to a first multiplier and the output of this first multiplier is coupled to an adder. The results of the adder are fed to a second adder and through a series of registers to a second multiplier back to the first adder. This second adder combines a modified imaginary data signal with an inverted modified real data signal and forwards it to an output register. Furthermore, a mode selection signal which is provided by the finite state machine is connected to the two comparators in accordance to whether the comb filter is operated by the antenna diversity unit or by the preamble detection unit. Moreover, as shown in FIG. 6, the flip flops are connected to an activation signal provided by the finite state machine.

The output ports of the comb filter are connected to the finite state machine and from the finite state machine to the consecutive functional units. In a modification of this embodiment, the output ports are directly connected to the next functional units. In a further modification of this embodiment, if the functional units each have separate finite state machines, the outputs of the comb filter are connected to the finite state machines of each functional unit.

Figure 10:
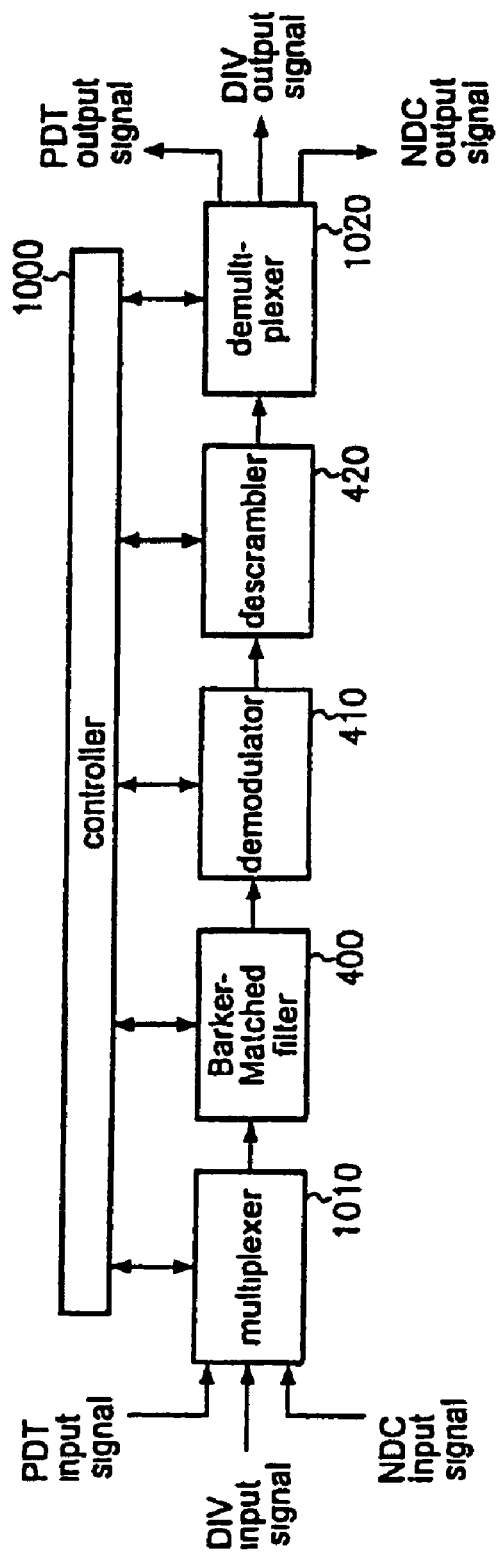
FIG. 10 is showing a block diagram illustrating signal processing circuits of an antenna diversity unit, preamble detection unit and a non-coherent detection unit according to another embodiment.

FIG. 10 shows another embodiment of the present invention. The preamble detection unit, the antenna diversity unit and the non-coherent detection unit each provide an output port, which is coupled to a multiplexer 1010. This multiplexer switches the signals of the functional units to the Barker-Matched filter 400. The Barker-Matched filter filters the signals and feeds it to the demodulator 410, which is connected to the descrambler 420. The descrambler outputs the results to a demultiplexer 1020 which switches the data stream to input ports of the preamble detection unit, the antenna diversity unit and the non-coherent detection unit. A controller is connected to the multiplexer and demultiplexer to control the switching operation in accordance to whether the signal processing circuit is operated by the preamble detection unit, antenna diversity unit or a non-coherent detection unit. If the signal processing circuit is operated by the antenna diversity unit the multiplexer is switched to the output port and the demultiplexer is switched accordingly to the input port of the antenna diversity unit. Consequently, the multiplexer and demultiplexer are controlled for the preamble detection unit and the non-coherent detection unit.

In a modification of this embodiment the multiplexer and demultiplexer are switched directly to output and input ports of subunits of the synchronization circuit dependent on which functional unit is operating the signal processing circuits.

Furthermore, the controller provides control signals to the Barker-Matched filter, demodulator and descrambler. In addition, the multiplexer, the Barker-Matched filter, the demodulator, the descrambler and the demultiplexer provide status signals for the controller to indicate their operation status. The control signals provided to the signal processing circuit may include activation signals for specific electronic components in the signal processing circuits.

Moreover, in a modification of this embodiment, the controller is a finite state machine.

The arrangement of FIG. 10 may be operated in three different modes according to which functional unit is operating the signal processing circuits.

In the first mode the antenna diversity unit is operating the multiplexer, the Barker-Matched filter, demodulator and descrambler and the demultiplexer. In this mode the signal processing circuits are working in a sliding window. This means that the Barker-Matched filter, demodulator and descrambler produce one output result for an input data sample of the data stream in accordance with the data rate using a data sample length of 22 or the length of the Barker symbol oversampled by two. The results of the signal processing circuits are fed via the demultiplexer to an input port of the antenna diversity unit. In a modification of this embodiment the demultiplexer feeds the results directly to the antenna diversity finite state machine. In another modification of this embodiment the demultiplexer feeds the results directly to the comb filter.

In the second mode the preamble detection unit is operating the multiplexer, the Barker-Matched filter, demodulator and descrambler and the demultiplexer. In this mode the signal processing circuits are also working in a sliding window. This means as above mentioned that the Barker-Matched filter, demodulator and descrambler produce one output result for an input data sample of the data stream in accordance with the data rate using a data sample length of 22 or the length of the Barker symbol bversampled by two. The results of the signal processing circuits are fed via the demultiplexer to an input port of the preamble detection unit. In a modification of this embodiment the demultiplexer feeds the results directly to the preamble detection finite state machine. In another modification of this embodiment the demultiplexer feeds the results directly to the comb filter.

In the third mode the non-coherent detection unit is operating the multiplexer, the Barker-Matched filter, demodulator and descrambler and the demultiplexer. In this mode the data sample length is also 22, but the data output rate is 22 times lower than in the first or second mode. Compared with the antenna diversity unit or the preamble detection unit this means that the non-coherent detection unit uses only every $22^{nd}$ output of the signal processing circuits. The results of the signal processing circuits are fed via the demultiplexer to an input port of the non-coherent detection unit. In a modification of this embodiment the demultiplexer feeds the results directly to the non-coherent detection finite state machine. In another modification of this embodiment the demultiplexer feeds the results directly to the packet start detection unit 230.

For the above mentioned exemplary implementations of this embodiment a modification may be that the multiplexer has only two input ports, one for the antenna diversity unit and the preamble detection unit together and one for the non-coherent detection unit. Another modification may be that the multiplexer is replaced by another appropriate circuit providing only one single input for the antenna diversity unit, the preamble detection unit together and the non-coherent detection unit.

Referring to FIG. 3 the operation sequence of the above mentioned exemplary implementations of this embodiment is as follows. In the first operation step 310 the antenna diversity unit is detecting, whether the power of the data stream signal is exceeding a specific threshold. Once the power of the data stream signal is above a specific threshold, the antenna diversity unit starts the antenna selection. For this the antenna diversity unit repeatedly detects in equal time points, whether the power of the data stream signal is over a specific threshold. Once the antenna is selected, the preamble detection is started with step 320. Once the preamble of the received data stream is detected, the non-coherent mode is started in step 330. In this mode the start of frame delimiter is searched in the data stream. The output rate of the signal processing circuits is reduced, as the symbol synchronization has been finished. In a modification of this embodiment the Barker-Matched filter is working in a sliding window using a data sample length of 22 and a data rate in accordance with the data rate of the input data stream, but the other signal processing circuits such as demodulator and descrambler are working with a reduced data rate. The result of the operation is a train of demodulated bits which is directly forwarded via the demultiplexer to the packet start detection unit in a modification of this embodiment as mentioned above. Then the packet start detection unit searches for demodulated bit pattern in the received data stream. It is contemplated that further operating steps may be added and inserted in the embodiment described above.

The above mentioned arrangements may have the advantage that the number of gates in the circuitry can be reduced at the Barker-Matched filter, the demodulator and the descrambler can be re-used for the preamble detection unit, the antenna diversity unit and the non-coherent detection unit. Furthermore, this may reduce the efforts for the circuit development and the costs for manufacturing.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and the intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the amended claims.

What is claimed is:

1. A WLAN (Wireless Local Area Network) receiver having synchronization unit, said synchronization unit comprising:

a first functional unit configured to perform a first signal processing function;

a second functional unit configured to perform a second signal processing function different from said first signal processing function; and at least one signal processing circuit, wherein said first functional unit is configured to operate at least one of said signal processing circuits for performing said first signal processing function, and said second functional unit is configured to operate said at least one signal processing circuit operated by said first functional unit for performing said second signal processing function; and wherein said first and second functional units are arranged to provide a signal output port for said at least one signal processing circuits, and said synchronization unit further comprises a multiplexer configured to switch an input of said at least one signal processing circuits to one of said signal outputs provided by said first and second functional units for said at least one signal processing circuit.

2. The WLAN receiver according to claim 1, further comprising at least two antenna elements for receiving signals, wherein one of said first and second functional units in said synchronization unit is an antenna diversity unit configured to detect the antenna element with a received signal power larger than a specific threshold.

3. The WLAN receiver according to claim 2, wherein the other one of said first and second functional units is a non-coherent detection unit configured to demodulate data in a received data stream.

4. The WLAN receiver according to claim 2, wherein the other one of said first and second functional units is a preamble detection unit configured to detect a preamble in a received data stream.

5. The WLAN receiver according to claim 4, wherein one of said signal processing circuits in said synchronization unit is a Barker-Matched filter module.

6. The WLAN receiver according to claim 5, wherein said synchronization unit further comprises a demodulator module and said Barker-Matched filter module is arranged to provide an output signal to said demodulator module.

7. The WLAN receiver according to claim 6, wherein said synchronization unit further comprises a descrambler module and said demodulator module is arranged to provide an output signal to said descrambler module.

8. The WLAN receiver according to claim 7, wherein said synchronization unit further comprises a comb filter module and said descrambler module is arranged to provide an output signal to said comb filter module.

9. The WLAN receiver according to claim 8, wherein said synchronization unit further comprises a finite state machine for each of said first and second functional units configured to control at least one of said signal processing circuits.

10. The WLAN receiver according to claim 8, wherein said synchronization unit further comprises one single finite state machine for both of said first and second functional units configured to control at least one of said signal processing circuits.

11. The WLAN receiver according to claim 8, wherein said synchronization unit further comprises at least one finite state machine configured to control said Barker-Matched filter module, said demodulator module, said descrambler module and said comb filter module.

12. The WLAN receiver according to claim 11, wherein said at least one finite state machine further is arranged for providing an activation signal for at least one electronic component of said signal processing circuits.

13. The WLAN receiver according to claim 12, wherein at least one of said signal processing circuits is arranged for being operated in at least two different operation modes dependent on whether the signal processing circuit is operated by said first or second functional unit and said at least one finite state machine is further arranged for providing a selection signal for selecting one of said at least two different operation modes corresponding to said functional unit operating said signal processing circuits.

14. The WLAN receiver according to claim 13, wherein said synchronization unit further comprises a finite state machine for each of said first and second functional units configured to control at least one of said signal processing circuits.

15. The WLAN receiver according to claim 14, wherein at least one of said signal processing circuits is arranged for outputting at least one status signal to said finite state machine for indicating a status of said at least one of said signal processing circuits.

16. The WLAN receiver according to claim 13, wherein said at least one finite state machine is one single finite state machine controlling said signal processing circuits.

17. The WLAN receiver according to claim 16, wherein at least one of said signal processing circuits is arranged for outputting at least one status signal to said finite state machine for indicating a status of said at least one of said signal processing circuits.

18. The WLAN receiver according to claim 1, wherein one of said first and second functional units is a preamble detection unit configured to detect a preamble in a received data stream.

19. The WLAN receiver according to claim 18, wherein the other one of said first and second functional units is a non-coherent detection unit configured to demodulate data in a received data stream.

20. The WLAN receiver according to claim 1, wherein one of said first and second functional units is a non-coherent detection unit configured to demodulate data in a received data stream.

21. The WLAN receiver according to claim 1, wherein one of said signal processing circuits in said synchronization unit is a Barker-Matched filter module.

22. The WLAN receiver according to claim 1, wherein one of said signal processing circuits in said synchronization unit is a demodulator module.

23. The WLAN receiver according to claim 1, wherein one of said signal processing circuits in said synchronization unit is a descrambler module.

24. The WLAN receiver according to claim 1, wherein one of said signal processing circuits in said synchronization unit is a comb filter module.

25. The WLAN receiver according to claim 1, wherein said first and second functional units are arranged to provide a signal input port for said at least one signal processing circuits, and said synchronization unit further comprises a demultiplexer configured to switch an output of said at least one signal processing circuits to one of said signal input ports provided by said first and second functional units for said at least one signal processing circuits.

26. The WLAN receiver according to claim 1, wherein at least one of said signal processing circuits is arranged for being operated in at least two different operation modes dependent on whether the signal processing circuit is operated by said first or second functional unit, said mode being selectable by a selection signal provided by each of said first and second functional unit.

27. The WLAN receiver according to claim 1, wherein said synchronization unit further comprises at least one finite state machine for said functional units configured to control at least one of said signal processing circuits.

28. The WLAN receiver according to claim 27, wherein at least one of said signal processing circuits is arranged for outputting at least one status signal to said finite state machine for indicating a status of said at least one of said signal processing circuits.

29. The WLAN receiver according to claim 27, wherein said at least one finite state machine further is arranged for providing an activation signal for at least one electronic component of said signal processing circuits.

30. The WLAN receiver according to claim 29, wherein at least one of said signal processing circuits is arranged for being operated in at least two different operation modes dependent on whether the signal processing circuit is operated by said first or second functional unit and said at least one finite state machine further is arranged for providing a selection signal for selecting one of said at least two different operation modes corresponding to said functional unit operating said signal processing circuits.

31. The WLAN receiver according to claim 1, wherein said synchronization unit further comprises a finite state machine for each of said first and second functional units configured to control at least one of said signal processing circuits.

32. The WLAN receiver according to claim 1, wherein said synchronization unit further comprises one single finite state machine for both of said first and second functional units configured to control at least one of said signal processing circuits.

33. The WLAN receiver according to claim 1, wherein said synchronization unit further comprises:
  a third functional unit configured to perform a third signal processing function different from said first and second signal processing functions,
  wherein said third functional unit is configured to operate said at least one signal processing circuit operated by said first and second functional units, for performing said third signal processing function.

34. The WLAN receiver according to claim 33, further comprising at least two antenna elements for receiving signals, wherein one of said functional units in said synchronization unit is an antenna diversity unit configured to detect the antenna element with a received signal power larger than a specific threshold, one of said functional units is a preamble detection unit configured to detect a preamble in a received data stream and one of said functional units is a non-coherent detection unit configured to demodulate data in a received data stream.

35. The WLAN receiver according to claim 34, wherein one of said signal processing circuits in said synchronization unit is a Barker-Matched filter module.

36. The WLAN receiver according to claim 35, wherein said synchronization unit further comprises a demodulator module and said Barker-Matched filter module is arranged to provide an output signal to said demodulator module.

37. The WLAN receiver according to claim 36, wherein said synchronization unit further comprises a descrambler module and said demodulator module is arranged to provide an output signal to said descrambler module.

38. The WLAN receiver according to claim 37, wherein said first, second and third functional units are arranged to provide a signal output port and a signal input port for said at least one signal processing circuits, and said synchronization unit further comprises a multiplexer configured to switch an input of said at least one signal processing circuits to one of said signal output ports provided by said first, second and third functional units for said at least one signal processing circuits and a demultiplexer configured to switch an output of said at least one signal processing circuits to one of said signal input ports provided by said first, second and third functional units for said at least one signal processing circuits.

39. The WLAN receiver according to claim 38, wherein said synchronization unit further comprises a controller said controller being arranged for controlling said multiplexer and said demultiplexer.

40. The WLAN receiver according to claim 39, wherein said controller is a finite state machine.

41. The WLAN receiver according to claim 39, wherein at least one of said signal processing circuits is arranged for outputting at least one status signal to said finite state machine for indicating a status of said at least one of said signal processing circuits.

42. The WLAN receiver according to claim 33, wherein said first, second and third functional units are arranged to provide a signal output port and a signal input port for said at least one signal processing circuits, and said synchronization unit further comprises a multiplexer configured to switch an input of said at least one signal processing circuits to one of said signal output ports provided by said first, second and third functional units for said at least one signal processing circuits and a demultiplexer configured to switch an output of said at least one signal processing circuits to one of said signal input ports provided by said first, second and third functional units for said at least one signal processing circuits.

43. The WLAN receiver according to claim 42, wherein said synchronization unit further comprises a controller configured to control said multiplexer and said demultiplexer.

44. The WLAN receiver according to claim 43, wherein said controller is a finite state machine.

45. The WLAN receiver according to claim 33, wherein said synchronization unit further comprises a finite state machine for each of said first, second and third functional units configured to control at least one of said signal processing circuits.

46. The WLAN receiver according to claim 33, wherein said synchronization unit further comprises one single finite state machine for said first, second and third functional units configured to control at least one of said signal processing circuits.

47. The WLAN receiver according to claim 1, wherein said synchronization unit further comprises:
  a third functional unit arranged configured to perform a third signal processing function different from said first and second signal processing functions; and
  at least two signal processing circuits,
  wherein said first and said second functional units are configured to operate a first of said at least two signal processing circuits and said second and said third functional unit are configured to operate a second of said at least two signal processing circuits.

48. The WLAN receiver according to claim 1, being IEEE 802.1 lb compliant.

49. A method of operating a synchronization unit in a WLAN (Wireless Local Area Network) receiver, the method comprising:
  performing a first signal processing function and performing a second signal processing function different from said first signal processing function, wherein said performing said first signal processing function comprises operating at least one signal processing circuit of said synchronization unit, and the step of performing said second signal processing function comprises operating said at least one signal processing circuit; and wherein said performing said first and second signal processing functions further comprises operating a multiplexer, said multiplexer being arranged for switching an input port of said at least one signal processing circuits to output ports of at least two subunits of said WLAN receiver, wherein said operating the multiplexer comprises switching said input port to said output ports dependent on whether said first signal processing function or said second signal processing function is operated.

50. The method of claim 49, wherein said method further comprises:
performing a signal processing function different from said first and second signal processing functions, wherein said third functional unit is configured to operate said at least one signal processing circuit operated by said first and second functional units, for performing said third signal processing function.

51. The method of claim 49, further comprises operating at least two antenna elements for receiving signals, wherein one of said first and second signal processing function is an antenna diversity function configured to detect the antenna element with a received signal power larger than a specific threshold.

52. The method of claim 49, wherein one of said first and second signal processing function is a preamble detection function configured to detect a preamble in a received data stream.

53. The method of claim 49, wherein one of said first and second signal processing function is a non-coherent detection function configured to demodulate data in a received data stream.

54. The method of claim 49, wherein one of said signal processing circuits operated by said method is a Barker-Matched filter module.

55. The method of claim 49, wherein one of said signal processing circuits operated by said method is a demodulator module.

56. The method of claim 49, wherein one of said signal processing circuits operated by said method is a descrambler module.

57. The method of claim 49, wherein one of said signal processing circuits operated by said method is a comb filter module.

58. The method of claim 49, wherein said performing said first and second signal processing functions further comprises operating a demultiplexer, said demultiplexer being arranged for switching an output port of said at least one signal processing circuits to input ports of at least two subunits of said WLAN receiver, wherein said operating the demultiplexer comprises switching said output port to said input ports dependent on whether said first signal processing function or said second signal processing function is operated.

59. The method of claim 49, wherein at least one of said signal processing circuits operated by said method is arranged for being operated in at least two different operation modes dependent on whether the signal processing circuit is operated by said first or second signal processing function, said mode being selected by a selection step performed by each of said first and second signal processing function.

60. The method of claim 49, wherein said method further comprises at least one finite state machine for said signal processing functions for controlling at least one of said signal processing circuits.

61. The method of claim 60, wherein said at least one finite state machine further is providing an activation step for activating at least one electronic component of said signal processing circuits.

62. A WLAN (Wireless Local Area Network) receiver having synchronization unit, said synchronization unit comprising:
a first functional unit configured to perform a first signal processing function;
a second functional unit configured to perform a second signal processing function different from said first signal processing function; and
at least one signal processing circuit,
wherein said first functional unit is configured to operate at least one of said signal processing circuits for performing said first signal processing function, and said second functional unit is configured to operate said at least one signal processing circuit operated by said first functional unit for performing said second signal processing function; and
wherein said first and second functional units are arranged to provide a signal input port for said at least one signal processing circuits, and said synchronization unit further comprises a demultiplexer configured to switch an output of said at least one signal processing circuits to one of said signal input ports provided by said first and second functional units for said at least one signal processing circuit.

63. A method of operating a synchronization unit in a WLAN (Wireless Local Area Network) receiver, the method comprising:
performing a first signal processing function and performing a second signal processing function different from said first signal processing function,
wherein said performing said first signal processing function comprises operating at least one signal processing circuit of said synchronization unit, and said performing said second signal processing function comprises operating said at least one signal processing circuit; and
wherein said performing said first and second signal processing functions further comprises operating a demultiplexer, said demultiplexer being arranged for switching an output port of said at least one signal processing circuits to input ports of at least two subunits of said WLAN receiver, wherein said operating the demultiplexer comprises switching said output port to said input ports dependent on whether said first signal processing function or said second signal processing function is operated.

* * * * *